(12) United States Patent
Fericean et al.

(10) Patent No.: US 10,534,077 B2
(45) Date of Patent: Jan. 14, 2020

(54) PROXIMITY SENSOR AND METHOD FOR MEASURING THE DISTANCE FROM AN OBJECT

(71) Applicant: Balluff GmbH, Neuhausen a. d. F. (DE)

(72) Inventors: Sorin Fericean, Leonberg (DE); Mark Eberspaecher, Frickenhausen (DE)

(73) Assignee: Balluff GmbH, Neuhausen a. d. F.

( * ) Notice: Subject to any disclaimer, the term of this patent is extended or adjusted under 35 U.S.C. 154(b) by 275 days.

(21) Appl. No.: 15/555,609

(22) PCT Filed: Mar. 6, 2015

(86) PCT No.: PCT/DE2015/100091
§ 371 (c)(1),
(2) Date: Sep. 5, 2017

(87) PCT Pub. No.: WO2016/141905
PCT Pub. Date: Sep. 15, 2016

(65) Prior Publication Data
US 2018/0045820 A1    Feb. 15, 2018

(51) Int. Cl.
*G01S 13/36* (2006.01)
*G01S 7/03* (2006.01)
(Continued)

(52) U.S. Cl.
CPC .......... *G01S 13/36* (2013.01); *G01S 7/03* (2013.01); *G01S 13/88* (2013.01); *H01P 1/20* (2013.01)

(58) Field of Classification Search
CPC ... G01S 13/36; G01S 7/03; G01S 7/35; G01S 13/88; H01P 1/20
(Continued)

(56) References Cited

U.S. PATENT DOCUMENTS 3,460,139 A * 8/1969 Rittenbach ............ G01S 13/765
342/60
3,495,246 A * 2/1970 Hellmuth .................. G01S 1/02
342/155
(Continued)

FOREIGN PATENT DOCUMENTS

DE    10 2008 061 227 A1    7/2010
DE    10 2010 009 664 A1    9/2011
(Continued)

OTHER PUBLICATIONS

International Search Report of PCT/DE2015/100091, dated Dec. 7, 2015.
(Continued)

*Primary Examiner* — Timothy A Brainard
*Assistant Examiner* — Nuzhat Pervin
(74) *Attorney, Agent, or Firm* — Collard & Roe, P.C.

(57) ABSTRACT

A proximity sensor measures the distance of a target and a method operates the proximity sensor. The proximity sensor emits a transmission signal as a free-field transmission wave, which is reflected at the target and as a free-field reflection signal is received by the proximity sensor as a reflection signal, wherein the determining of the distance is provided from the phasing of the reflection signal in relation to the phasing of the transmission signal. The proximity sensor shifts the phasing of the transmission signal chronologically.

21 Claims, 5 Drawing Sheets

(51) Int. Cl.
*G01S 13/88* (2006.01)
*H01P 1/20* (2006.01)

(58) Field of Classification Search
USPC ........................................................ 342/127
See application file for complete search history.

(56) References Cited

U.S. PATENT DOCUMENTS

| | | | | |
|---|---|---|---|---|
| 4,042,931 A * | 8/1977 | Gustafsson | ............... | G01S 3/22 342/427 |
| 5,079,556 A * | 1/1992 | Itoh | ............... | G01S 7/288 342/109 |
| 5,359,339 A * | 10/1994 | Agrawal | ............ | H01Q 13/0275 333/248 |
| 6,445,191 B1 * | 9/2002 | Trummer | ............... | F15B 15/12 324/635 |
| 6,956,522 B2 * | 10/2005 | Gottwald | ............... | G01S 7/285 342/127 |
| 9,267,823 B2 * | 2/2016 | Trummer | ............ | F15B 15/2869 |
| 9,625,575 B2 * | 4/2017 | Trummer | ............ | F15B 15/2869 |
| 9,851,235 B2 * | 12/2017 | Blodt | ............... | G01F 23/284 |
| 2007/0273575 A1 * | 11/2007 | Yang | ............... | G01S 7/35 342/127 |
| 2007/0287634 A1 * | 12/2007 | Lin | ............... | H01P 1/182 505/126 |
| 2010/0073222 A1 * | 3/2010 | Mitomo | ............... | G01S 7/35 342/175 |
| 2011/0227785 A1 * | 9/2011 | Sakurai | ............... | G01S 13/345 342/200 |
| 2011/0285576 A1 * | 11/2011 | Lynam | ............... | B60T 7/22 342/70 |
| 2014/0218255 A1 * | 8/2014 | Sanford | ............... | H01Q 1/525 343/837 |
| 2014/0261887 A1 * | 9/2014 | Groot | ............... | G01S 7/415 141/383 |
| 2015/0042506 A1 * | 2/2015 | Busuioc | ............... | G01S 7/032 342/70 |
| 2015/0048969 A1 * | 2/2015 | Ferицean | ............... | G01S 7/4008 342/145 |
| 2015/0362354 A1 * | 12/2015 | Schultheiss | ............ | G01F 23/284 342/124 |
| 2016/0124083 A1 | 5/2016 | Fericean et al. | | |
| 2016/0154093 A1 * | 6/2016 | Hesse | ............... | G01S 7/03 342/83 |
| 2016/0204496 A1 * | 7/2016 | Hobden | ............... | G01S 7/034 342/200 |
| 2016/0218406 A1 * | 7/2016 | Sanford | ............... | H01P 1/208 |

FOREIGN PATENT DOCUMENTS

| | | | | |
|---|---|---|---|---|
| EP | 1 000 314 B1 | 4/2002 | | |
| EP | 2 013 417 B1 | 1/2009 | | |
| WO | WO-2008089806 A1 * | 7/2008 | ............ | G01S 17/32 |
| WO | WO-2012142985 A1 * | 10/2012 | ............ | G01S 7/4008 |
| WO | 2015/000452 A1 | 1/2015 | | |
| WO | WO-2015096958 A2 * | 7/2015 | ............ | H01Q 21/065 |
| WO | 2016/101940 A1 | 6/2016 | | |
| WO | WO-2016141905 A1 * | 9/2016 | ............... | G01S 7/03 |

OTHER PUBLICATIONS

Andreas Stelzer et al: "A Microwave Position Sensor with Submillimeter Accuracy", IEEE Transactions on Microwave Theory and Techniques, vol. 47, No. 12, Dec. 1, 1999.

S. Bonerz, W. Bechteler, J. Greif, "Sensorsystem zur Überwachung der Werkzeugplananlage auf Basis von Keramikresonatoren und Hohlleiterstrukturen", ANSYS Conference and 29th CADFEM Users Meeting, Oct. 19-21, 2011.

T. F. Bechteler, A. S. A. Bechteler, "The Groove-Guide Oscillator,", IEEE Microwave Magazine, vol. 12, No. 6, pp. 110-119, Oct. 2011.

C. Nguyen S. Kim, Abstract (p. vii) from "Theory, Analysis and Design of RF Interferometric Sensors", Springer-Verlag 2012.

* cited by examiner

PROXIMITY SENSOR AND METHOD FOR MEASURING THE DISTANCE FROM AN OBJECT

CROSS REFERENCE TO RELATED APPLICATIONS

This application is the National Stage of PCT/DE2015/100091 filed on Mar. 6, 2015, the disclosure of which is incorporated by reference. The international application under PCT article 21(2) was not published in English.

The invention is based on a proximity sensor and a method for measuring the distance from a target according to the type of the independent claims.

PRIOR ART

In the patent specification EP 1 000 314 B1, a circular cylindrical distance measuring device is described that is based on determining the resonant frequency of a cavity resonator. The resonator is formed from the resonator housing and the target to be detected. The physical resonator length is thus composed from the length of the resonator housing and the distance to the target. If a minimum size of the target to be detected is exceeded, the resonant frequency is immediately linked to the length of the resonator, from which the target distance can be inferred. The specific dependency between resonator length and resonant frequency depends on the present field distribution and thus on the waveguide wave mode used. The electric permittivity of the waveguide filling is thus included as a deciding factor in the design. If this value increases, on the one hand, both the construction length of the resonator and the required cross-section become smaller. On the other hand, the range of the distance measuring device is, however, also reduced with increasing permittivity.

With the device described, a metallised dielectric is provided as a resonator rear wall, the evaluation electronic system being located on the outside thereof. To couple the electronic system to the resonator, either a coplanar slot coupling or a microstrip line is proposed.

Coupling by means of the microstrip line is then, above all, helpful when the evaluation electronic system is to be remotely assembled from the resonator, for example because of the thermal uncoupling. Additionally, either one or two coupling points can be implemented depending on whether the resonator is to be used in transmission or in reflection operation.

To determine the resonant frequency, the evaluation electronic system contains an adjustable oscillator, the frequency of which being linearly tuned within a certain bandwidth and the resulting reflection or transmission factor of the resonator being observed. In the vicinity of a resonant frequency, these factors have strong variations that can be recognised systematically by differentiating with respect to the frequency. Since a linear connection between frequency and time exists in a circuitry manner because of the control, the derivation with respect to the frequency can be obtained by means of a derivation with respect to the time. If the second derivative obtained in such a way exceeds a predetermined threshold, a resonance is recognised and the frequency is not further detuned, but rather kept constant and its current value is determined by means of a frequency counter.

As an alternative approach for determining the frequency, in the patent specification EP 1 000 314 B 1, a concept based on a closed phase-locked loop (PLL) is proposed. In doing so, the nominal frequency is predetermined via a direct digital synthesiser (DDS) as a reference variable of the PLL. If the detection circuit now recognises a resonance, the frequency is immediately known because of the settings of the digital synthesiser, whereby the cycle duration of a measurement can clearly be shortened.

Regardless of how the resonant frequency is determined, with this resonator method, the fact that the distance region to be determined immediately predetermines the necessary bandwidth of the operational frequency is disadvantageous. The usable bandwidth for industrial sensors is fixedly predetermined and thus the distance region as well.

Regardless of the ISM bands allowed (Industrial, Scientific and Medical band), a frequency range of between 1-100 GHz for the operation is proposed, wherein the bandwidth should be roughly 2 GHz or 10%. Additionally, it has proved to be difficult to be able to implement large distance ranges with this resonator concept. The reason for this is, on the one hand, that with increasing distances, the changes to the resonant frequency become smaller.

Additionally, the decreasing quality factor of the resonator still only leads to weakly pronounced minima in the reflection or transmission factors, whereby the detection of the associated resonant frequencies becomes prone to error. This is obvious when the location of the resonant frequency is illustrated in the complex frequency plane. With decreasing quality factor, the complex eigenfrequency departs from the ω-axis, whereby, when detuning the oscillator, a singularity can no longer be run through. The limited range is additionally dependent on the choice of the TE01 wave mode used, since the field distribution around the waveguide in this case has extensively evanescent waves that subside quickly with increasing distance.

In the review by S. Bonerz, W. Bechteler, J. Greif, "Sensorsystem zur Überwachung der Werkzeugplananlage auf Basis von Keramikresonatoren and Hohlleiterstrukturen", ANSYS Conference and 29th CADFEM Users Meeting, 19-21 Oct. 2011, a method was proposed in which the determination of a distance of a target by a distance sensor was also based on a waveguide resonator. Here too, the distance to be measured determines the length of a resonator and thus the resonant frequency thereof. Here, the waveguide wave mode used is the base mode TE11 of a circular cylindrical waveguide. The resonant frequency is determined by a frequency sweep by means of measuring the received active power of the resonator.

In the review by T. F. Bechteler, A. S. A. Bechteler, "The Groove-Guide Oscillator,", IEEE Microwave Magazine, Vol. 12, No. 6, pages 110-119, October 2011, a distance measuring method is described based on a so-called groove-guide oscillator that also corresponds to a resonator concept. Although here the problem of distance measuring is also traced back to determining eigenfrequencies of a resonator, this system, however, differs fundamentally both in terms of construction of the resonator and in the proposed determination of the resonant frequency from the solution approach described in the patent specification EP 1 000 314 B1. The key element of the known distance sensor is a groove-guide oscillator. In principle, in microwave technology, groove-guide is to be understood as a waveguide that includes two plates opposing one another into which, in the propagation direction, a notch with a rectangular cross-section is introduced in each case. The whole arrangement is symmetrical relative to a plane, the normal of which coincides with the connection line of the two plates. In the space that emerges as a result of the notches and the conductive plates, wave modes capable of being propagated can exist in the direction of the notches. Because of the symmetry required and the strong dependency of the propagation properties on the plate distance, this waveguide places high demands on the manufacturing accuracy.

The manufacture of an alternatively useable "half-symmetrical" waveguide is substantially easier, in which the one half of the arrangement is completely replaced by a conductive plane.

The dependency of the propagation constants on the distance to the target that is also present in the described waveguides is used to determine the distance. Thus, for implementing a resonator, the notch is introduced such that it is not straight anymore, but circular, so that a circular conductor loop emerges. A resonance then arises exactly when an integer multiple of the guided wavelength corresponds exactly to the perimeter of the conductor. Since the guided wavelength is a function of the plate distance and the frequency, the resonance condition can be met within a certain bandwidth for different distances and, as a result, information about the distance can be obtained.

The oscillator is energised by means of a Gunn element, whereby the oscillator oscillates on its eigenfrequency. The frequency determination then takes place by means of a heterodyne system, in which the down-mixed eigenfrequency is applied to a frequency counter. Because of the construction, the described distance sensor has a large overall size since the diameter of the resonator has to be chosen to be comparatively large in order to keep the loss of radiation in the radial direction small. For operation between 8-12 GHz, the diameter of the described resonator is 60 mm with a plate size of 200 mm×200 mm. The measuring region obtained thereby extends from 13-15 mm. If the plate distance is further increased, higher wave modes can occur in the observed frequency region, whereby ambiguity arises.

In the patent specification DE 10 2010 009 664 A1, a distance sensor is described that, on the one hand, is used for monitoring the distance between a work spindle of a tool machine and the stationary part of the tool machine and, on the other hand, for controlling a tool's contact with a plane. Additionally, conclusions about the rotational speed of the work spindle and the quality of the spindle bearing are possible.

The distance sensor contains a high frequency wire that is connected to an oscillator and to a reflection measuring device. The position of the work spindle relative to the high frequency wire influences the reflection properties such that the distance can be calculated from the determined reflection factor. The high frequency wire is implemented, for example, as a microstrip line that is produced from a flexible material which is fixed on the surface of the stationary part of the tool machine by adhesion.

A high frequency transmission signal provided by an oscillator is coupled into the high frequency wire. One part of the transmission signal is decoupled from a first directional coupler and applied to a first power detector. The predominant part of the transmission signal is fed into the high frequency wire after passing through a second directional coupler.

The reflection signal emitted back from the target superimposes the transmission signal. One part of the reflection signal is decoupled from the second directional coupler and applied to a second power detector. The two power detectors are connected to an evaluating unit that determines and emits the ratio of the two powers, from which a measure for the distance of the target can be specified.

Additionally, another dielectric resonator can be provided that causes a pronounced resonance behaviour of the distance sensor. A change of the distance of the target from the dielectric resonator causes a shift of the resonant frequency of the dielectric resonator. Determining the distance of the target can then, additionally or alternatively, be based on the evaluation of the frequency change, In the review by C. Nguyen, S. Kim, Theory "Analysis and Design of RF Interferometric Sensors", Springer-Verlag 2012, an interferometric method for operating a distance sensor is described. In this method, to obtain the distance information, the phase shift between a sent and the received signal is evaluated. In doing so, distances between the distance sensor and the target that are greater than half the wavelength of the signal can no longer be clearly recognised from the phasing. In this review, it is proposed to obtain an unambiguous phase information by means of algorithms of the signal processing. However, for this purpose, it is necessary here that the target is shifted from the origin to the position to be measured, wherein the phase is continuously recorded. An absolute measuring distance sensor cannot be implemented with this.

In the review by A. Stelzer et al. "A Microwave Position Sensor with Submillimeter Accuracy", IEEE Transaction on Microwave Theory and Techniques, Vol. 47, No. 12, December 1999, a hybrid method is described in which the interferometric method is combined with the known radar method, for example the FMCW method (Frequency Modulation Continuous Wave). Although such a method again allows an unambiguous distance determination, the method cannot simply be used to replace known inductive distance sensors in the industrial sector. The main reason for this is that, typically, the minimally possible measuring distance is determined by means of the bandwidth of the operating frequency, such that it cannot be measured up to position zero. Furthermore, applicable rules relating to emissions of electromagnetic radiation have to be considered. An operation is only possible within an ISM band, which is why it cannot be freely decided on the bandwidth and the resulting minimum distance. For example, a minimum distance of 60 cm appears for a standard system fully using the available bandwidth of 250 MHz of the ISM band at 24 GHz.

In the international patent application PCT/DE2013/000342 (corresponding to U.S. Patent Application Publication No. 2016/0124083), a sensor for determining the position or the distance of a target is described, with which the microwave technique for determining the position or the distance measurement is also used. The proximity sensor described contains a microwave oscillator that provides a transmission wave as an output signal, which the proximity sensor emits in the direction of the target as a free space transmission wave that the target, which is electrically conductive or has at least one electrically conductive surface, reflects as a free space reflection wave and the proximity sensor receives as a reflection wave. Determining the reflection factor from the transmission wave and the reflection wave is provided, which the proximity sensor provides as a measure for the distance. The proximity sensor described is characterized in that the coupling of the transmission wave is guided in the waveguide as a waveguide. transmission wave, the coupling of the transmission wave into the waveguide is provided by a wave mode that leads to detaching the waveguide transmission wave at the aperture on the front end of the waveguide into the free space transmission wave and to propagating the free space transmission wave to the target. Measuring with higher and measuring with lower resolution can be assumed in order to obtain clarity over a greater distance. With greater distances, ambiguity of the phase angle of the complex reflection factor occurs. A clear determination of the distance from the phase of the reflection factor is therefore provided by considering the magnitude of the reflection factor, if there is ambiguity of the phase of the reflection factor within the predetermined measuring region.

In the non-published international patent application PCT/DE2014/100464, a development of the sensor described above with relation to the published patent application PCT/DE2013/000342 for determining the position or the distance of a target is implicated in the non-published international patent application PCT/DE2014/100464. In the waveguide used as a sensor head, a transmission path for guiding the transmission wave is provided as a waveguide transmission wave and at least one receiving path electromagnetically uncoupled from the transmission path is provided for guiding the reflection wave reflected by the target as a waveguide reflection wave. Thus, along with the transmission path, a receiving path separate to the transmission path is simultaneously available, such that measuring the transmission factor is also possible, in addition to or alternatively to measuring the reflection factor.

If, apart from the target, there are no other objects in the region of the proximity sensor described in published patent application PCT/DE2013/000342, on which parasitic reflections could emerge, the reflection factor determined can be recalculated by means of a conformal mapping described in the document as an exact measurement for the distance. The measuring accuracy, however, decreases when the free-field transmission wave emitted by the waveguide is not only reflected on the target, but additionally also on a mounting plate in which the waveguide is mounted. Along with a unique reflection, in addition, further subsequent parasitic reflections can emerge on the mounting plate and on the target, until the energy of the free space reflection wave subsides. The parasitic reflections influence the received reflection signal and thus have a direct effect on the measuring accuracy. In particular, depending on the distance to the target and the installation situation, it can result in resonance effects, whereby the conformal mapping described can also result in an inaccurate measuring result. The rough measuring described, which serves, in particular, to remove the ambiguity in the fine measuring based on a phase measuring, is particularly affected by this effect. Measuring errors can emerge as a result which amount to multiples of half the wavelength of the microwave signal.

The object of the invention is to specify a proximity sensor for measuring the distance of a target and a method for operating the proximity sensor which have a high resistance to interference.

The object is solved by the features specified in the independent claim.

DISCLOSURE OF THE INVENTION

The invention relates to a proximity sensor for determining the distance of a target from the proximity sensor. The proximity sensor emits a transmission signal as a free-field transmission wave that is reflected on the target and, as a free-field reflection wave, is received by the proximity sensor as a reflection signal. The determination of the distance is provided from the phasing of the reflection signal in relation to the phasing of the transmission signal.

The proximity sensor according to the invention is characterised in that a switching of the phasing of the transmission signal is provided in chronological sequence.

The proximity sensor according to the invention has the advantage that the free-field transmission wave reflected on the target can be separated from parasitic reflections. In doing so, the described influence of the surrounding and the installation situation of the proximity sensor on the determined distance is minimised and, correspondingly, the measuring accuracy is increased.

As a result of the switching of the phasing of the transmission signal, a state periodically arises in which the free-field transmission wave previously emitted is still on the way to the target or already back to the proximity sensor as a free-field reflection wave, such that the received reflection signal still has the previous original phasing, while the currently present transmission signal already has the new phasing after the switching. Thus, for the duration of the running time of the free space transmission wave from the proximity sensor to the target and the free space reflection wave back to the proximity sensor, when evaluating the phasing of the reflection signal in relation to the phasing of the transmission signal, an impulse occurs, the duration of said impulse corresponding exactly to the determined distance.

The time between the impulses, which can be called impulse pauses, presents a quasi-stationary state in which the original phasing of the transmission signal is at the basis of the received reflection signal. A determination of the distance is also possible in principle during this quasi-stationary state according to prior art, wherein, however, in doing so, it has to be calculated with uncertainty because of parasitic reflections.

Advantageous embodiments and developments of the proximity sensor according to the invention are respectively the subject matter of dependent claims.

One embodiment provides a periodic switching of the phasing of the transmission signal. The periodic switching of the phasing brings the advantage that a plurality of measuring signals is obtained which can be the basis of the determination of the distance, for example as part of averaging.

The cycle duration of the periodic switching preferably ranges between 1 nanosecond and 500 nanoseconds, for example at 10 ns, which, on the one hand, in terms of signals, can be managed with comparatively simple means and, on the other hand, leads in particular to a ratio of impulse duration to impulse pause which allows a relatively simple evaluation of the impulse durations. Since the emitted spectrum is influenced by the cycle duration of the phase states, the cycle duration can also be chosen in such a way that the spectrum satisfies the applicable regulations for emitting electromagnetic energy.

It is provided according to an advantageous embodiment to set the phasing w of the transmission signal to $+\psi$ and $-\psi$ alternately. In doing so, the phasing is changed in each case by a fixed, predetermined value that can be changed, however, in subsequent measuring cycles in order to achieve an advantageous effect on the impulse heights which emerge in a mixing signal described below in more detail.

A phase shifter is preferably provided to switch the phasing of the transmission signal, said phase shifter preferably being able to be implemented particularly simply by means of switchable wiring pieces.

One embodiment provides that the frequency of the transmission signal ranges from 1 GHz-30 GHz. The transmission signal is preferably at least approximately 24 GHz in the ISM band described at the start.

One development of the proximity sensor according to the invention provides that a waveguide is provided for emitting the free-field transmission wave. Here, it is preferably provided that the transmission signal is guided in the waveguide as a waveguide transmission wave, the coupling-in of the transmission signal as the waveguide transmission signal into the waveguide is provided by a wave mode that leads to detaching the waveguide transmission wave at the aperture on the front end of the waveguide into the free-space transmission wave and to propagating the free-space transmission wave to the target. The advantage of this development lies in that a large linearity region is achieved when determining the distance, wherein the determined distance, in particular, is independent of the permeability of the target.

The TE11 mode is preferably provided as the wave mode, preferably using a circular-cylindrical waveguide.

One embodiment of the waveguide provides that a dielectric window is arranged on the aperture on the front end of the waveguide, said dielectric window preventing dirt ingress into the waveguide.

A mixer is preferably provided to determine the distance between the proximity sensor and the target from the phasing of the transmission signal and the phasing of the received reflection signal, said mixer mixing the transmission signal with the reflection signal and providing a corresponding mixing signal which has the impulse durations, in each case followed by the impulse pauses.

The information about the distance is contained in the impulse durations. To obtain a measurement for the distance, a low-pass filter is preferably provided that, as a result, carries out a moving integration of the mixing signal. Then, an integration is preferably provided in which the direct signal components lying between the impulses are faded out and only the impulse durations relative to an average are integrated as a measure for the distance.

The method for operating the proximity sensor according to the invention provides a mixture of the transmission signal with the reflection signal by means of a multiplication of the two signals. The mixer then provides the mixing signal.

One embodiment provides that the phasing of the transmission signal is adaptively changed depending on the already determined distance to the target from a value of $\pm\psi 1$ to a different value $\pm\psi 2$, where necessary. Thus, both an influencing of the impulse heights which emerge in the mixing signal is possible and the emergence of impulses influences as such is influenced.

One development of this embodiment provides that the phasing of the transmission signal is then changed to a new phase switching value when the current predetermined phasing of the transmission signal is the same as the phase shift due to the running time of the transmission signal so that, with each change of phasing, an impulse can occur.

An advantageous embodiment of the method provides that the mixing signal is low-pass filtered and the low-pass filtered mixing signal is used as a measurement for the distance. It is preferred, however, that the direct components of the low-pass filtered signal are initially removed in a signal processing arrangement, such that only the impulses remain which are then preferably integrated to form the average. This integrated signal is an averaged measurement for the distance. A particularly advantageous development of the method provides that the determined distance according to the invention is used for the rough measuring of the distance as with the method according to prior art according to the international application PCT/DE2013/000342 and thus any ambiguity in a more highly resolved determination of the distance is removed.

Further advantageous embodiments and developments of the proximity sensor according to the invention and the method according to the invention for measuring the distance of a target arise in the following description.

Exemplary embodiments of the invention are depicted in the drawing and are explained in more detail in the subsequent description.

DETAILED DESCRIPTION OF THE EXEMPLARY EMBODIMENTS

Figure 1:
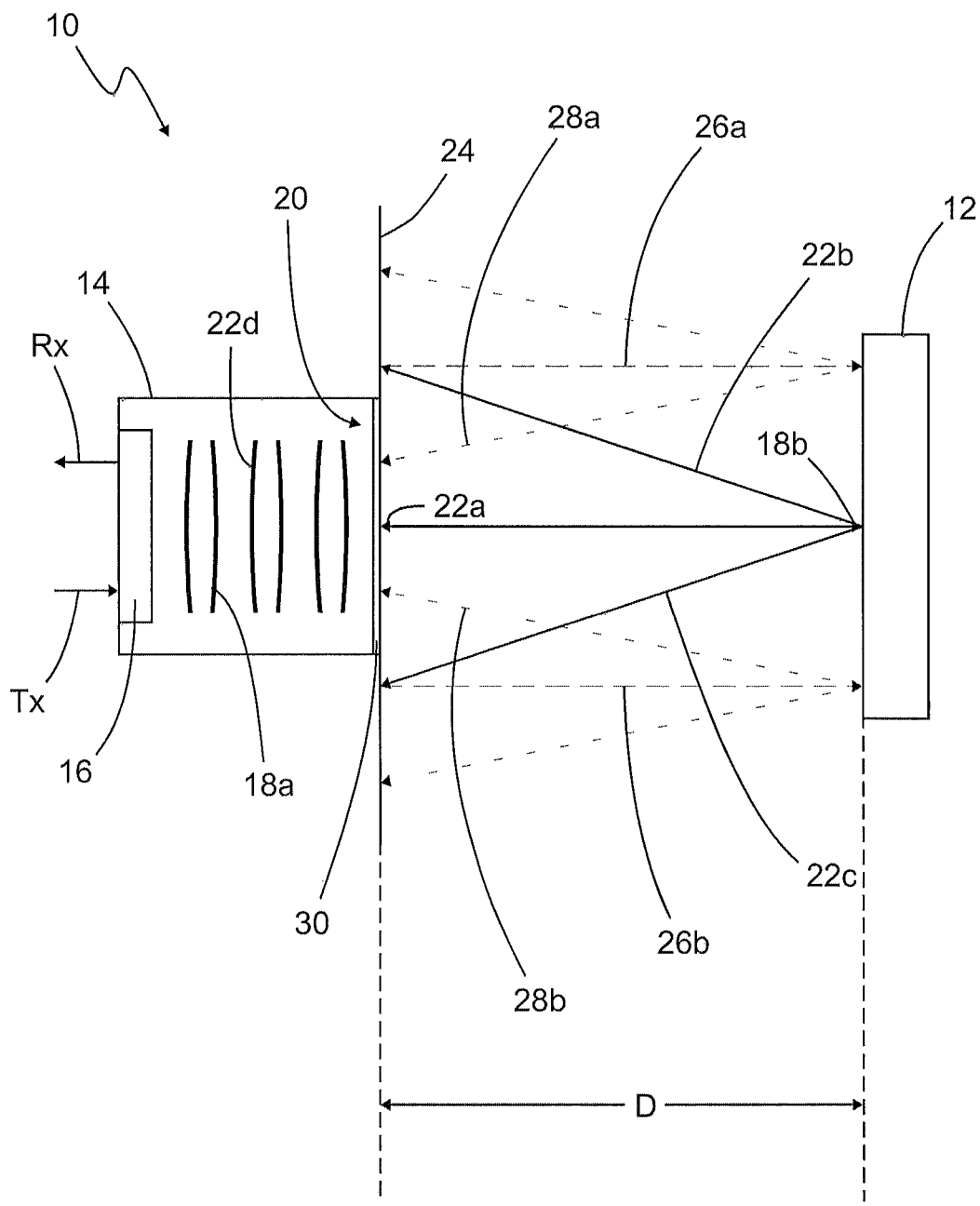
FIG. 1 shows a sketch of a part of a proximity sensor according to the invention.

In FIG. 1, a part of a proximity sensor 10 according to the invention is depicted which can also be called a sensor head. The proximity sensor 10 according to the invention detects the distance D between the proximity sensor 10 and a target 12.

A preferably circular-cylindrical formed waveguide 14 is provided to which a wave mode transformer 16 is allocated. A transmission signal Tx is transformed by the wave mode transformer 16 into a waveguide transmission signal 18a which is emitted at the aperture 20 of the waveguide 14 on the front end as a free space transmission wave 18b. At the same time, the wave mode transformer 16 provides a reflection signal Rx.

The coupling of the transmission signal Tx into the waveguide 14 takes place in a wave mode that leads to detaching the waveguide transmission wave 18a at the aperture 20 into the free-space transmission wave 18b. When using a circular-cylindrical waveguide, the TE11 wave mode is preferably provided as the wave mode. The specification of the wave mode takes place by means of the wave mode transformer 16.

The circular-cylindrical formation of the waveguide 14 allows, in particular, a simple exchange of proximity sensors that are already present with the proximity sensor 10 according to the invention. In addition, established fixing devices can still be used.

In FIG. 1, a development of the waveguide 14 is shown, according to which the aperture 20 is closed by a dielectric material 30 in order to prevent dirt ingress into the waveguide 14.

The free space transmission wave 18b runs up to the target 12, the free space transmission wave 18b being reflected on the electrically conductive surface of said target 12 as a free space reflection wave 22a, 22b, 22c within an angle region in the direction of the proximity sensor 10. The free space reflection wave 22a, 22b, 22c enters in great parts into the waveguide 14 via the aperture 20, in which the free space reflection wave 22a, 22b, 22c runs as a waveguide reflection wave 22d up to the wave mode transformer 16 which obtains a reflection signal Rx from the waveguide reflection wave 22d.

An at least small part of the free space reflection wave 22b, 22c can impinge, for example, on a fixing flange 24 of the waveguide 14 depending on the surrounding conditions and on the installation properties of the waveguide 14. There, this part of the free space reflection wave 22b, 22c is reflected again and can, depending on the geometric properties, once again reach the target 12, in a sense, as a parasitic free space transmission wave 26a, 26b, a further reflection emerging on the surface of the target 12. As a result, a parasitic free space reflection wave 28a, 28b emerges which at least partially enters into the aperture 20 of the waveguide 14 again and overlaps with the original waveguide reflection wave 22d. The reflection process can be repeated several times until the energy of the waves subsides.

Under the premise that the determination of the distance D is based on the evaluation of the transmission signal Tx and the reflection signal Rx, for example on the determination of the impedance of the superimposed waves or the determination of the reflection factor at a gate of a switching arrangement and/or on the determination of the transmission factor from the ratio of the reflection signal Rx to the transmission signal Tx at two gates and/or the determination of the phase shifting between the reflection signal Rx and the transmission signal Tx, it has to be a distortion of the measuring result must be taken into account when one or more parasitic free space reflection waves 28a, 28b . . . emerge, which enters into the waveguide via the aperture 20.

Figure 2:
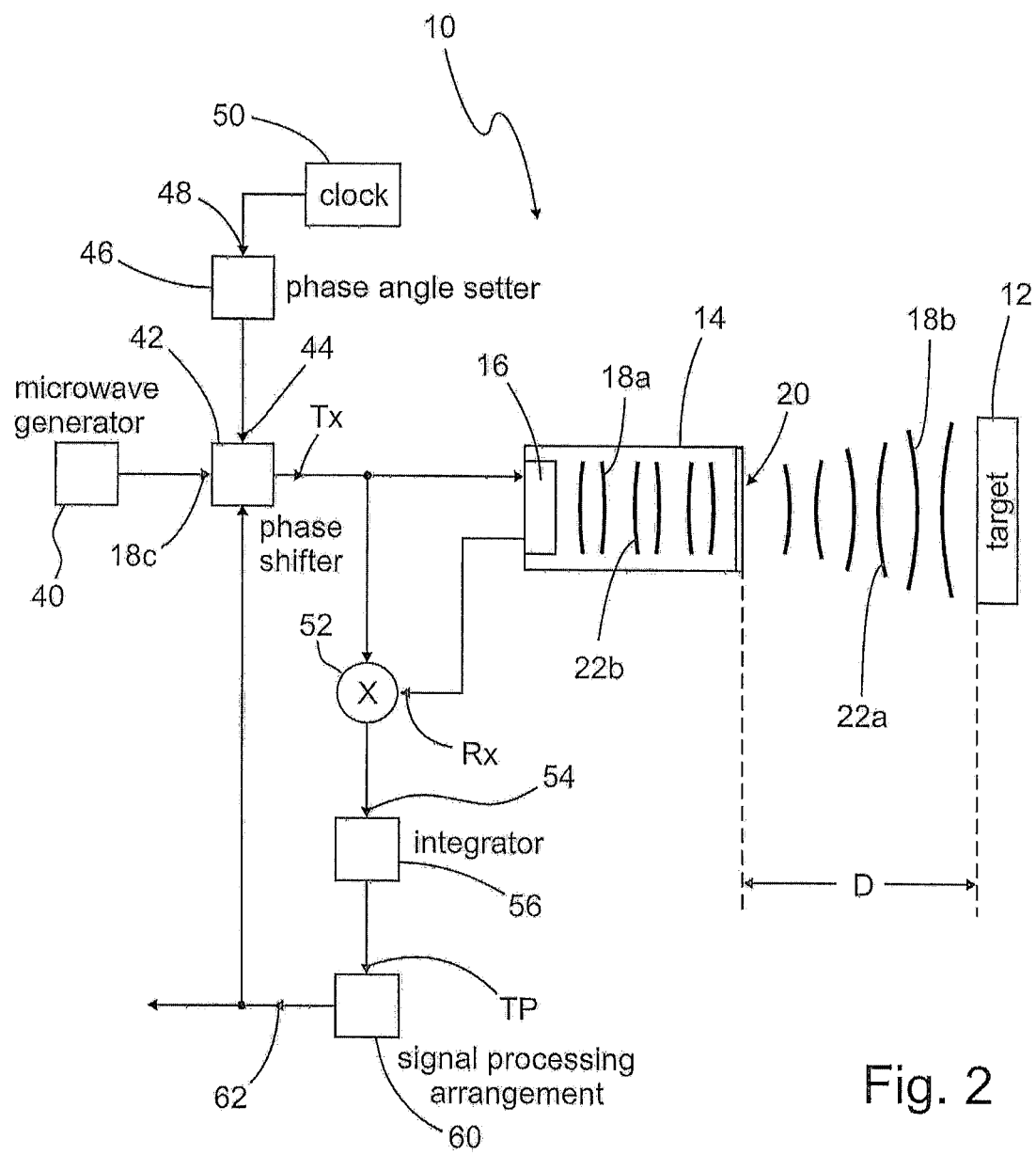
FIG. 2 shows a block wiring diagram of the proximity sensor according to the invention.

A block wiring diagram of the proximity sensor 10 according to the invention is shown in FIG. 2.

The parts shown in FIG. 2 that correspond to the parts shown in FIG. 1 are each labelled with the same reference numbers.

A microwave generator 40 provides a source transmission signal 18c which is applied to a phase shifter 42. The phase shifter 42 allows a change of the phasing $\psi$ of the source transmission signal 18c. The phasing $\psi$ can be changed by means of a switching signal 44. The switching signal 44 is predetermined by setting the phase angle 46 which predetermines the switching signal 44 depending on a clock signal 48 which is provided by a clock generator 50. Switching between the phasing +$\psi$ and −$\psi$ is preferably provided. The phase shifter 42 provides the transmission signal Tx. The phase shifter 42 is preferably constructed from switchable wiring pieces which allow an inexpensive implementation of the phase shifter 42.

Both the transmission signal Tx and the reflection signal Rx are applied to a mixer 52 which multiplicatively mixes the transmission signal Tx with the reflection signal Rx and provides the mixing signal 54 as a mixing product.

The mixing signal 54 is applied to an integrator 56 which is preferably implemented as a low-pass filter and provides a low-pass filtered average signal TP of a signal processing arrangement 60.

The signal processing arrangement 60 provides an output signal 62 which represents a measurement for the distance D. The determined measurement for the distance D corresponding to the output signal 62 can be provided as an analogue signal. Alternatively or additionally, the output signal 62 can be provided as a switching signal which signals that a determined distance D has been exceeded or has not been met.

According to an advantageous embodiment, it is provided that the output signal 62 is provided to the phase shifter 42 which sets the phase shifting $\psi$ depending on the output signal 62, wherein the measurement for the distance D determines the amount of the phase shifting $\psi$.

Figure 3:
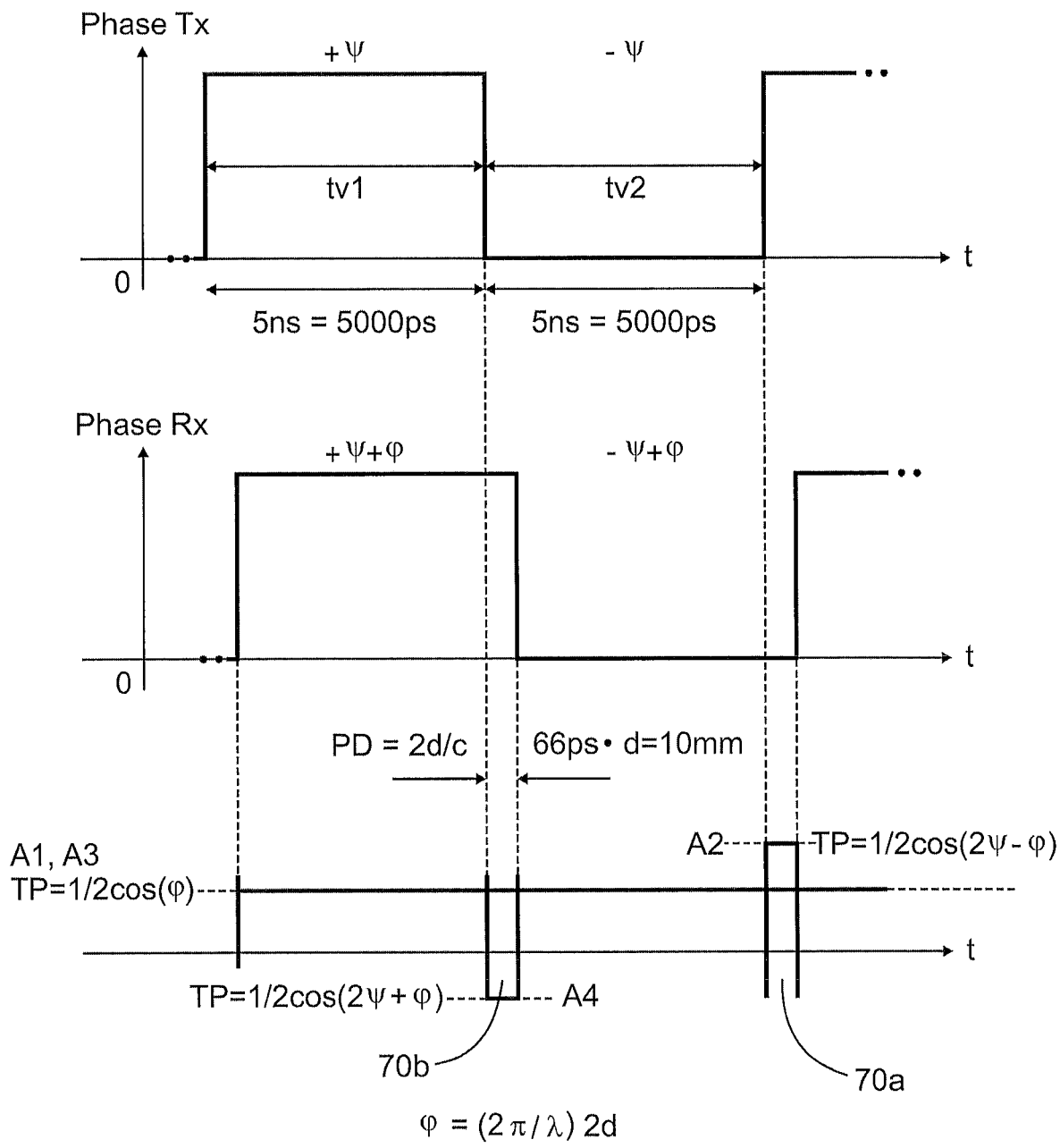
FIG. 3 shows the phasing of a transmission signal and the phasing of a reflection signal and impulses occurring in a low-pass filtered mixing signal.

The operating principle of the proximity sensor 10 according to the invention is explained in more detail by means of the correlations shown in FIG. 3 as a function of time t.

It is assumed that the clock signal 48, which controls the phase switching, has a frequency of 100 MHz, for example. The frequency of the clock signal 48, on the one hand, must be high enough to result in a pulse duty factor of impulses to direct component of 1:50-1:2000, for example, that is easy to evaluate, taking the wavelength of the transmission signal Tx and the determined distance D into consideration, and, on the other hand, should not be too high so that the spectrum of the transmission signal Tx lies within permissible limits.

In the exemplary embodiment shown, the cycle duration is 10 ns or 10,000 ps, wherein a pulse duty ratio of the clock signal 48 of 50%, for example, is assumed.

In the upper diagram, the phasing of the transmission signal Tx is depicted, which can be set in a first time interval t1 of the time duration 5,000 ps to +$\psi$ and in a second time interval t2 also of the time duration 5,000 ps to −$\psi$.

In the central diagram, the phasing of the resulting reflection signal Rx is depicted, which is shifted by a phase shifting $\varphi$ with respect to the phasing of the transmission signal Tx because of the running time of the transmission signal Tx.

The determination of the distance D takes place on the basis of the determination of the running time of the free-field transmission wave 18b from the waveguide 14 to the target 12 and the free-field reflection wave 22a reflected by the target 12 back from the target 12 to the waveguide 14. Because of the possible occurrence of parasitic free space transmission waves 26a, 26b, . . . or of parasitic free-field reflection waves 28a, 28b, . . . , the measuring based on the transmission signal Tx in relation to the reflection signal Rx can be affected by measuring uncertainty.

According to the invention, the switching of the phasing $\psi$ of the transmission signal Tx is thus provided. The switching of the phasing $\psi$ in each case has an effect at the start of each time interval tv1, tv2. At the start of each time interval tv1, tv2, an impulse 70a, 70b occurs in the mixing signal 54, said impulse 70a, 70b having a certain time duration PD that depends on the distance D.

The impulses 70a, 70b occur as follows.

The transmission signal Tx shall be a microwave signal having a frequency of approximately 24 GHz, for example, with the predetermined phasing $\psi$. The transmission signal Tx:

$$Tx=\sin(\omega t+\psi)$$

has the determined known phasing $\psi$ at any time point.

In the following calculation of the phase shifting or the phase delay between the transmission signal Tx and the reflection signal Rx, the amplitudes can no longer be considered.

The transmission signal Tx runs to the target 12 as a free space transmission wave 18a, is reflected on the target 12 and runs back as a free space reflection wave 22a and occurs as a reflection signal Rx which suffer, along with the original phasing $\psi$, the additional phase shifting +$\varphi$ because of the running time t1 of the free space transmission wave 18a and the free space reflection wave 22a:

$$Rx=\sin(\omega t+\psi+\varphi)$$

The phase shifting $\varphi$ or phase delay $\varphi$ depends on the distance D.

The phase delay φ appears as:

$$\varphi = -2\frac{2 \cdot \pi \cdot f}{c} \cdot D,$$

or as:

$$\varphi = (2\pi/\lambda)2D,$$

wherein c is the speed of light and f is the frequency and λ is the wavelength of the transmission signal Tx, respectively.

Within the first time interval tv1, a first transmission signal Tx1 shall be present having the phasing +ψ:

$$Tx1 = \sin(\omega t + \psi).$$

In this operating state, a first reflection signal Rx1 is present:

$$Rx1 = \sin(\omega t + \psi + \varphi)$$

The mixing of the transmission signal Tx1 in the mixer 52 with the receiving signal Rx1, which shall correspond to a multiplication, results in a mixing signal 54 out of which the signal TP having the relative amplitude A1 arises after a low-pass filtering:

$$A1 = Tx1 \cdot Rx1 \rightarrow \sin(\omega t + \varphi) \cdot \sin(\omega t + \psi + \varphi) =$$
$$\frac{1}{2} \cdot [\cos(-\varphi) - \cos(2\omega t + 2\psi + \varphi)]$$
$$A1 = \frac{1}{2} \cdot \cos(\varphi)$$

In the third diagram of FIG. 3, this resulting low-pass filtered signal TP is shown after mixing in the mixer 52 and the average formation in the integrator 56.

At the end of the first time interval tv1, a switching of the phasing ψ of the transmission signal Tx from +ψ to −ψ takes place, which thus changes during a second time interval tv2 into a following second transmission signal Tx2:

$$Tx2 = \sin(\omega t - \psi)$$

The first receiving signal Rx1 which is still on the move without the altered phasing ψ between the waveguide 14 and the target 12 is described as before by the equation:

$$Rx1 = \sin(\omega t + \psi + \varphi).$$

The mixing of the second transmission signal Tx2 with the first receiving signal Rx1, in this case, leads to a mixing signal 54 only during the running time t1 of the first transmission signal Tx1 from the waveguide 14 to the target 12 and back again to the waveguide 14, the signal TP having a second amplitude A2 arising from said mixing signal 54 after a low-pass filtration:

$$A2 = Tx2 \cdot Rx1 \rightarrow \sin(\omega t - \psi) \cdot \sin(\omega t + \psi + \varphi) =$$
$$\frac{1}{2} \cdot [\cos(-2\psi - \varphi) - \cos(2\omega t + \varphi)]$$
$$A2 = \frac{1}{2} \cdot \cos(2\psi + \varphi)$$

The second amplitude A2 of the mixing signal A2 is present for the impulse duration PD, the duration of which corresponds to the running time t1 and thus represents a measurement for the distance D. For example, it is stated that an impulse duration PD=2 D/c of 66 ps corresponds to a distance of 10 mm.

Because of the switching of the phasing ψ of the transmission signal Tx at the start of the second time interval tv2, the second transmission signal Tx2 is present during the entire second time interval tv2:

$$Tx2 = \sin(\omega t - \psi),$$

which has the phasing −ψ because of the switching.

After the impulse duration PD, the first reflection signal Rx1 changes to a second reflection signal Rx2 that has a changed phasing because of the change of the phasing ψ of the second transmission signal Tx2:

$$Rx2 = \sin(\omega t - \psi + \varphi).$$

In the further course of the second time interval tv2, the mixture of the second transmission signal Tx2 with the second reflection signal Rx2 results in a mixing signal 54 out of which the signal TP emerges having a third amplitude A3 after a low-pass filtration:

$$A3 = Tx2 \cdot Rx2 \rightarrow \sin(\omega t - \psi) \cdot \sin(\omega t - \psi + \varphi) =$$
$$\frac{1}{2} \cdot [\cos(-\varphi) - \cos(2\omega t - 2\psi + \varphi)]$$
$$A3 = \frac{1}{2} \cdot \cos(\varphi)$$

The third amplitude A3 is the same as the first amplitude A1 since there is again a quasi-stationary state without signal transients.

At the end of the second time interval tv2, a switching of the phasing ψ of the transmission signal Tx takes place again which shall then again be present during the following first time interval tv1.

Purely in principle, a different phase change ψ from before can be predetermined. As already mentioned, it can be provided according to one embodiment that the phase change from −ψ to +ψ takes place such that the first transmission signal Tx1 is present again:

$$Tx1 = \sin(\omega t + \psi).$$

The second reflection signal Rx2 that, because of the running time t1 is still present without the effects of the renewed phase change, is described after as before by the equation:

$$Rx2 = \sin(\omega t - \psi + \varphi).$$

The mixture of the first transmission signal Tx1 with the second reflection signal Rx2 during the running time t1 of the free space transmission wave 18b from the waveguide 14 to the target 12 and back again to the waveguide 14 leads to a mixing signal 54, out of which the signal TP emerges having a fourth amplitude A4 after a low-pass filtration:

$$A4 = Tx1 \cdot Rx2 \rightarrow \sin(\omega t + \psi) \cdot \sin(\omega t - \psi + \varphi) =$$
$$\frac{1}{2} \cdot [\cos(+2\psi - \varphi) - \cos(2\omega t + \varphi)]$$
$$A4 = \frac{1}{2} \cdot \cos(2\psi - \varphi)$$

The fourth output signal A4 is again present for the impulse duration PD, the duration of which corresponds to the running time t1 and thus represents a measurement for the distance D.

As a result, impulses only occur at the mixer 52 when the phase state changes lead to argument changes of the cos function. Deviations can occur during the transition from the first to the second time internal tv1, tv2 and again during the subsequent transition from the second to the first time interval tv2, tv1.

Thus, the impulse height during the transition from the first to the second time interval tv1, tv2 is given by the connection:

$$TP = \frac{1}{2} \cdot \cos(2\psi + \varphi)$$

while, during the transition from the first to the second time interval tv1, tv2, the impulse height is described by the connection:

$$TP = \frac{1}{2} \cdot \cos(2\psi - \varphi).$$

Figure 4:
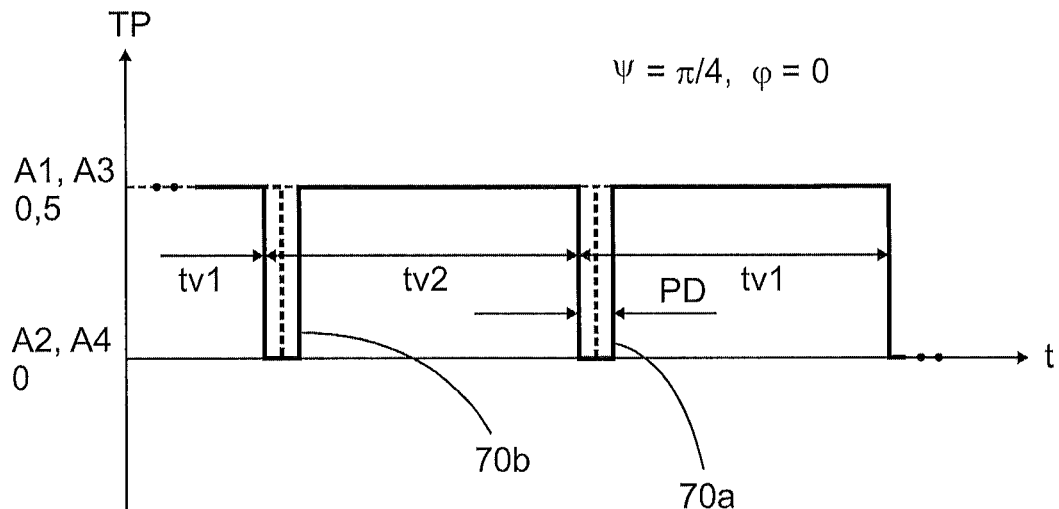
FIG. 4 shows a first possible low-pass filtered mixing signal which occurs in the proximity sensor according to the invention.
Figure 5:
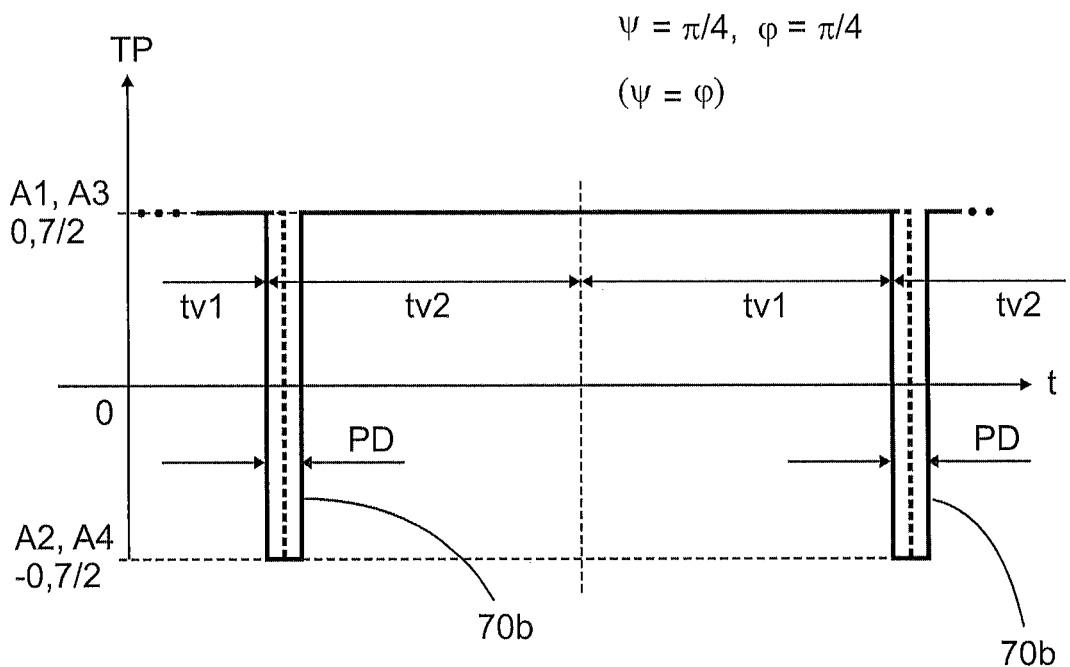
FIG. 5 shows a different possible low-pass filtered mixing signal which occurs in the proximity sensor according to the invention and FIG. 6 shows a further possible low-pass filtered mixing signal which occurs in the proximity sensor according to the invention.
Figure 6:
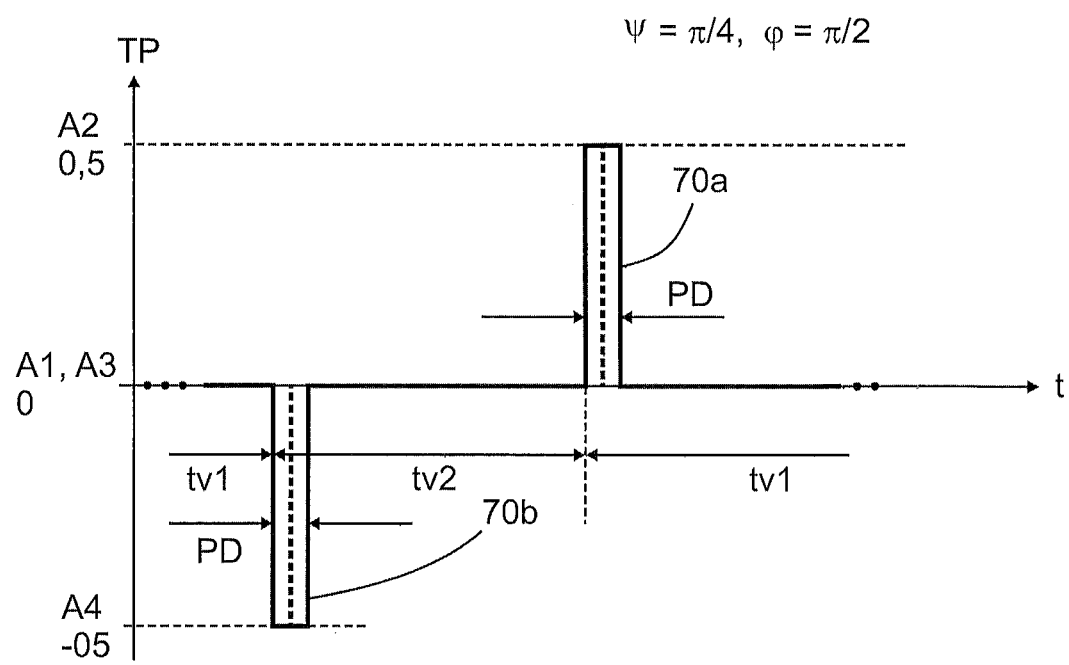

The function of the proximity sensor 10 according to the invention is further described in more detail by means of the low-pass filtered mixing signals TP shown in FIGS. 4, 5 and 6 as a function of time t, said mixing signals TP occurring at different distances D and different predetermined phase angles $\psi$.

In FIGS. 4-6, the two time intervals tv1, tv2 are each again entered, the sum of which corresponds to the cycle duration of the clock signal 48.

According to one embodiment, the two time intervals tv1, tv2 shall again be of equal length.

According to a particularly advantageous embodiment, the time intervals tv1, tv2 shall occur periodically.

The cycle duration which corresponds to the sum of the two time intervals tv1, tv2 can lie, for example, between a few nanoseconds and up to several 100 nanoseconds, for example. For example, the cycle duration is again 10 ns, corresponding to a clock frequency of 100 MHz. Under the premise that the two time intervals tv1, tv2 are of equal length, each time interval is then 5 ns or 5,000 ps. The switching signal 44 sets the phasing $\psi$ of the transmission signal Tx which thus changes in 5 ns cycles, wherein a change of the phasing $\psi$ of the transmission signal Tx is preferably provided from $+\psi$ and back again to $-\psi$.

In FIGS. 4, 5, and 6, the impulses 70a, 70b are entered both with a solid line and a dotted line. The dotted line impulses 70a, 70b with the shorter impulse durations PD here correspond to a distance D which is smaller than the distance with the solid line by lambda/2.

As already mentioned, according to one embodiment, it can be provided that only two periodically repeating time intervals tv1, tv2 can be predetermined which shall also be the same length according to the further preferred embodiment that has already been mentioned.

Because of the correlations presented, the relative amplitudes A1, A3 of the direct components are always equally large and depend only on the phase shifting $\varphi$. During a subsequent integration of the low-pass filtered signal TP, the direct components that can be easily measured have to be left out so that the distance D can be determined correctly.

The signal courses shown in FIGS. 4-6, corresponding in each case to the low-pass filtered signal TP, are depicted for different combinations of phasings $\psi$ and for different phase delays $\varphi$. Along with the labels for the relative amplitudes A1, A2, A3, A4, in each case the relative number value is stated.

FIG. 4 shows the low-pass filtered signal TP for $\psi=\pi/4$ and $\varphi=0$.

FIG. 5 shows the signal TP for $\psi=\pi/4$ and $\varphi=\pi/4$. In general, this signal course shown applies in the case that the phasing $\psi$ is the same as the phase shifting $\varphi$. Here, an impulse 70b only occurs when changing from the first time interval tv1 to the second time interval tv2, whereas when changing from the second time interval tv2 back to the first time interval tv1, no impulse occurs.

According to one embodiment, it is therefore provided to change the phasing $\psi$ from a first value $\pm\psi1$ to a different value $\pm\psi2$ so that this effect is avoided.

FIG. 6 shows the low-pass filtered signal TP for $\psi=\pi/4$ and $\varphi=\pi/2$.

In this specific case, the components A1 and A3 are zero and the impulse amplitudes have the same value, albeit with different signs. Integrating TP would result in a value of zero which does not allow a determination of the distance. In this case, the phasing $\pm\psi1$ is replaced by $\mp\psi2$.

The low-pass filtered signal TP is applied to the signal processing arrangement 60 which allows the exact determination of the distance D as part of a digital signal processing. To do so, the low-pass filtered signal TP is initially released from the direct components with the relative amplitudes A1, A3, the height of which is always the same, and subsequently integrated such that an average formation of the impulse durations PD takes place, which represents the phase shifting $\varphi$ and thus the distance D. The integration and the average value formation equalises sporadic measurement fluctuations, respectively.

According to an advantageous embodiment, it is provided that the determination of the distance D according to the invention, which is unambiguous in terms of the maximum detectable distance D, is used for roughly measuring the proximity sensor 10 according to the invention. Unambiguity can be achieved by means of this measure when a highly resolved detection of the distance D is provided which, however, in terms of the maximum detectable distance D, would lead to an ambiguous measuring result periodically repeating with half the wavelength of the transmission signal Tx. For example, the measuring described in the prior art according to the international patent application PCT/DE2013/000342 can be used as the highly resolved method for determining the distance, which is based on a determination of the reflection factor. The process provided according to the invention for determining the distance can replace the rough measuring or rough calibration described in said prior art.

The invention claimed is:

1. A proximity sensor for determining a distance of a target from the proximity sensor, wherein the proximity sensor emits a transmission signal as a free-field transmission wave that is reflected on the target and, as a free-field reflection wave, is received by the proximity sensor as a reflection signal, wherein the determination of the distance from a phasing of the reflection signal in relation to a phasing of the transmission signal is provided, wherein a switching of the phasing of the transmission signal is provided in chronological sequence such that the free-field transmission wave previously emitted is still on the way to the target or already back to the proximity sensor as a free-field reflection wave, such that the received reflection signal still has the previous original phasing, while the currently present transmission signal already has the new phasing after the switching, wherein during the running time of the free space transmission wave from the proximity sensor to the target and the free space reflection wave back to the proximity sensor when evaluating the phasing of the reflection signal in relation to the phasing of the transmission signal an impulse occurs, a duration of the impulse corresponding to the determined distance.

2. The proximity sensor according to claim 1, wherein a periodic switching of the phasing of the transmission signal is provided.

3. The proximity sensor according to claim 2, wherein the cycle duration of the periodic switching of the phasing of the transmission signal is between 500 nanoseconds and 1 nanosecond.

4. The proximity sensor according to claim 1, wherein the phasing of the transmission signal is set to a positive phasing and a negative phasing alternately.

5. The proximity sensor according to claim 1, wherein a phase shifter is provided for switching the phasing of the transmission signal.

6. The proximity sensor according to claim 5, wherein a phase shifter is implemented by means of switchable wiring pieces.

7. The proximity sensor according to claim 1, wherein a frequency of the transmission signal ranges from 1 GHz-30 Ghz.

8. The proximity sensor according to claim 7, wherein the frequency of the transmission signal is 24 GHz.

9. The proximity sensor according to claim 1, wherein a waveguide is provided for emitting the free-field transmission wave.

10. The proximity sensor according to claim 9, wherein the transmission signal is guided in the waveguide as a waveguide transmission wave, the coupling-in of the transmission signal is provided as a waveguide transmission wave in the waveguide with a wave mode that leads to detaching the waveguide transmission wave at the aperture on the front end of the waveguide into the free-space transmission wave and to propagating the free-space transmission wave to the target.

11. The proximity sensor according to claim 10, wherein the TE11 wave mode is provided as the wave mode in a circular-cylindrical waveguide.

12. The proximity sensor according to claim 10, wherein at least one wave mode transformer is provided for setting the wave mode of the waveguide transmission wave in the waveguide.

13. The proximity sensor according to claim 10, wherein the waveguide is formed to be circular cylindrical.

14. The proximity sensor according to claim 10, wherein a dielectric window is provided at the aperture on the front end of the waveguide.

15. The proximity sensor according to claim 1, wherein a mixer is provided for mixing the transmission signal with the reflection signal, wherein said mixer provides a mixing signal.

16. The proximity sensor according to claim 15, wherein a low-pass filter is provided for filtering the mixing signal.

17. A method for operating a proximity sensor for determining a distance of a target from the proximity sensor, wherein the proximity sensor emits a transmission signal as a free-field transmission wave that is reflected on the target and, as a free-field reflection wave, is received by the proximity sensor as a reflection signal, wherein the determination of the distance from a phasing of the reflection signal in relation to a phasing of the transmission signal is provided, wherein a switching of the phasing of the transmission signal is provided in chronological sequence such that the free-field transmission wave previously emitted is still on the way to the target or already back to the proximity sensor as a free-field reflection wave, such that the received reflection signal still has the previous original phasing, while the currently present transmission signal already has the new phasing after the switching, wherein during the running time of the free space transmission wave from the proximity sensor to the target and the free space reflection wave back to the proximity sensor when evaluating the phasing of the reflection signal in relation to the phasing of the transmission signal an impulse occurs, a duration of the impulse corresponding to the determined distance, and wherein a mixture of the transmission signal with the reflection signal takes place via a multiplication of the two signals.

18. The method according to claim 17, wherein the phasing of the transmission signal is changed, depending on the distance, from ±1 to ±2.

19. The method according to claim 17, wherein the mixed signal is low-pass filtered and the guasi-stationary components of the low-pass filtered signal which occur between impulses are subtracted from the low-pass filtered signal and the resulting signal is interpreted as a measure for the distance.

20. The method according to claim 19, wherein an integration of the resulting signal is provided and the integration result is interpreted as a measure for the distance.

21. The method according to claim 17, wherein the determined distance is used to roughly measure the proximity sensor, and ambiguity with a higher resolved determination of the distance is eliminated according to a different method.

* * * * *